US007260471B2

(12) United States Patent
Matsuda et al.

(10) Patent No.: US 7,260,471 B2
(45) Date of Patent: Aug. 21, 2007

(54) DRIVE FORCE CONTROL APPARATUS OF RIDING VEHICLE, ITS CONTROL METHOD AND RIDING TYPE VEHICLE

(75) Inventors: Takeshi Matsuda, Shizuoka (JP); Hidenori Akatsuka, Shizuoda (JP); Daichi Noborio, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/468,242

(22) Filed: Aug. 29, 2006

(65) Prior Publication Data

US 2007/0050125 A1 Mar. 1, 2007

(30) Foreign Application Priority Data

Aug. 30, 2005 (JP) ............................ 2005-249415
Jun. 28, 2006 (JP) ............................ 2006-178776

(51) Int. Cl.
*G06F 19/00* (2006.01)
*F02D 41/22* (2006.01)

(52) U.S. Cl. ........................ 701/114; 477/906; 701/110

(58) Field of Classification Search ................ 701/114, 701/110, 93, 97, 51, 53; 180/206, 220, 170; 477/906
See application file for complete search history.

(56) References Cited

U.S. PATENT DOCUMENTS 5,505,277 A * 4/1996 Suganuma et al. ......... 180/206
7,200,482 B2 * 4/2007 Kawarasaki ................. 701/97

FOREIGN PATENT DOCUMENTS

| | | |
|---|---|---|
| JP | 10-238389 | 9/1998 |
| JP | 2002-256895 | 9/2002 |
| JP | 2003-201866 | 7/2003 |
| JP | 2006-291738 A * | 10/2006 |

* cited by examiner

*Primary Examiner*—Hieu T. Vo
(74) *Attorney, Agent, or Firm*—Hogan & Hartson LLP

(57) ABSTRACT

An engine (drive force) control apparatus for a motorcycle that prevents a change in vehicle behavior by noise or the like. A control CPU electronically controls injection and ignition of fuel and a throttle valve. An abnormality detecting portion detects an abnormality of the engine control apparatus by a predetermined abnormality detecting period. When the abnormality is detected, primary abnormality processing of the engine control apparatus is executed. When the abnormality is not detected, primary abnormality processing is released and an electronic control at normal time of the engine control apparatus is executed. When an abnormality detecting signal detected by the abnormality detecting portion continues even an elapse of a predetermined abnormality determining time period, primary abnormality processing is shifted to secondary abnormality processing.

7 Claims, 6 Drawing Sheets

DRIVE FORCE CONTROL APPARATUS OF RIDING VEHICLE, ITS CONTROL METHOD AND RIDING TYPE VEHICLE

RELATED APPLICATIONS

This application claims the benefit of priority under 35 USC 119 of Japanese patent application nos. 2005-249415, filed on Aug. 30, 2005, and 2006-178776, filed on Jun. 28, 2006, which applications are hereby incorporated by reference in their entireties.

BACKGROUND OF THE INVENTION

1. Field of the Invention

The present invention relates to a drive force control apparatus and particularly relates to a drive force control apparatus of a riding type vehicle that detects an abnormality of the drive force control apparatus.

2. Description of Related Art

An electronic throttle valve controls an opening degree of a throttle valve by an electronic control to control an intake amount of an engine (internal combustion engine) to realize low emission gas and low fuel cost. Such a construction is already adopted in portions of passenger vehicles.

In adopting an electronic throttle valve for a motorcycle, a drive motor for controlling an opening degree of a throttle valve needs to be arranged compactly while avoiding, interference with a fuel injection valve arranged at an intake path. Therefore, although a compact electronic throttle control apparatus mountable to a motorcycle is proposed in prior art such as JP-A-2002-256895, an electronic throttle control apparatus has not been adopted yet in motorcycles due to their inherent restrictions.

The electronic throttle valve is provided with a function for cutting the drive of the throttle valve by an electronic motor when some abnormality is brought about in a control system to return the throttle valve in a fully closing direction by an urge force of a spring (see, for example, JP-A-2003-201866).

In order to execute this function, a means for detecting that an abnormality is brought about in a control system of the electronic throttle valve is needed. For example, an opening degree of the throttle valve may be detected by a throttle sensor, and a signal of the throttle sensor needs to be constantly monitored in order to detect an abnormal output of the throttle sensor.

When the throttle sensor is otherwise normal, and an instantaneous abnormal signal is caused by noise or the like, although a normal state is recovered immediately, the state is nevertheless determined as an abnormality.

In order to exclude such instantaneous abnormal signal detection, a determination delay time period longer than a signal width of noise or the like may be provided. When an abnormal output continues for the determination delay time period, an abnormality is finally determined.

However, there is a concern that even when a control system becomes truly abnormal, the control of the throttle valve based on the abnormal output is continued until elapse of the determination delay time period. In particular, when applied to a riding type vehicle, a change in vehicle behavior is increased.

In JP-A-10-238389, when an abnormality of a throttle sensor is detected, a control amount of a throttle opening degree is set to a predetermined value (tentative abnormality control), and the throttle control is stopped when the abnormality continues after a determination delay time period has elapsed.

According to this method, a determination delay time before stopping the throttle control after detecting an abnormality is provided, and therefore, an abnormality detection due to an instantaneous abnormal signal by noise or the like is excluded. Further, the control amount of the throttle opening degree can be fixed to a predetermined amount during the determination delay time, and therefore, control of the throttle valve based on the instantaneous abnormal output of the throttle sensor can be avoided.

Although the method described in JP-A-10-238389 promotes reliability of the electronic throttle system, a tentative abnormality control is still carried out during the determination delay time period and therefore, there is a concern of changing vehicle behavior even by noise. Further, when normality is determined and control is returned to a normal state, there is also a concern of changing vehicle behavior.

SUMMARY OF THE INVENTION

The invention overcomes these drawbacks and provides a drive force control apparatus for a riding type vehicle (motorcycle) that restrains a change in vehicle behavior by noise or the like.

A drive force control apparatus for a riding type vehicle according to the invention includes a drive source and an abnormality detecting portion for detecting an abnormality of the drive force control apparatus. The abnormality detecting portion detects an abnormality of the drive force control apparatus by a predetermined abnormality detecting period. When the abnormality of the drive force control apparatus is detected by the abnormality detecting portion, primary abnormality processing of the drive force control apparatus is executed. When the abnormality is not detected, primary abnormality processing is released and an electronic control at normal time of the drive force control apparatus is executed. When an abnormality detecting signal detected by the abnormality detecting portion continues even after elapse of a predetermined abnormality determining time period, primary abnormality processing is shifted to secondary abnormality processing.

In one embodiment, the predetermined abnormality detecting period is equal to or smaller than $1/20$ of the predetermined abnormality determining time period.

In one embodiment, the drive source is an engine, a motor, or a transmission.

In one embodiment, the primary abnormality processing includes a same processing as the secondary abnormality processing.

A control method of a drive force control apparatus for a riding type vehicle according to the invention includes the steps of detecting an abnormality of the drive force control apparatus by a predetermined abnormality detecting period and executing primary abnormality processing of the drive force control apparatus when an abnormality of the drive force control apparatus is detected. Primary abnormality processing is released and control is executed at normal time of the drive force control apparatus when the abnormality is not detected. Primary abnormality processing is shifted to secondary abnormality processing when a detected abnormality detecting signal continues even after a predetermined abnormality determining time period.

In one embodiment, the drive source is an engine, a motor, or a transmission.

A riding type vehicle according to the invention is mounted with the drive force control apparatus.

According to the drive force control apparatus for a riding type vehicle of the invention, abnormality of the drive force control apparatus is detected by the predetermined abnormality detecting period When the abnormality is detected, primary abnormality processing is executed. When the abnormality is not detected, primary abnormality processing is released and control at normal time is executed. Therefore, abnormality detection by noise or the like is excluded. When the abnormality detecting signal continues even after elapse of the predetermined abnormality determining time period, primary abnormality processing is shifted to secondary abnormality processing. Therefore, control of the engine control apparatus based on abnormal output is also avoided. Thereby, a change in vehicle behavior is prevented, and reliability of the engine control apparatus is promoted.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
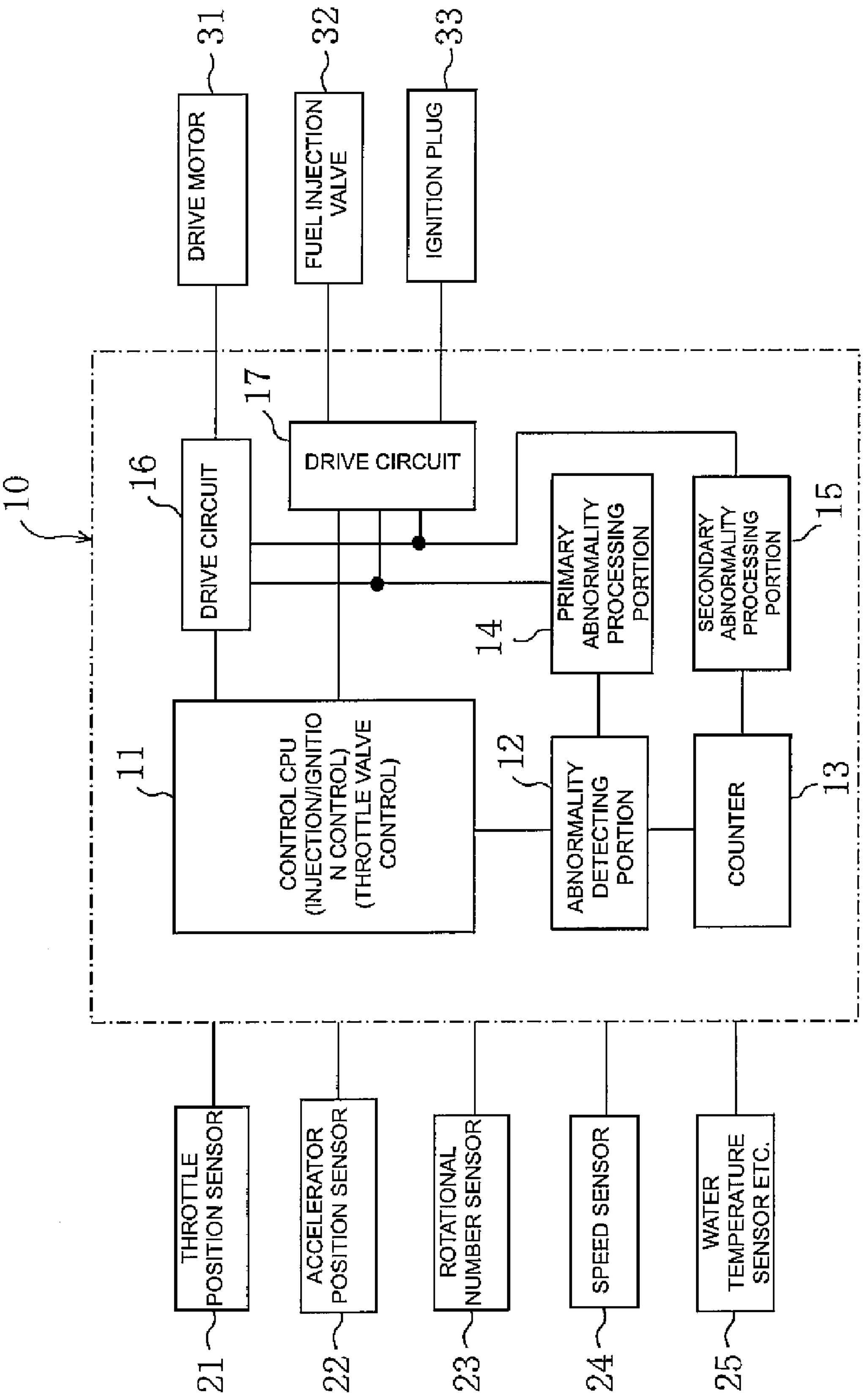
FIG. 1 is a block diagram of an engine control apparatus for a motorcycle according to the invention.

Embodiments of the invention are described with reference to the drawings. In the drawings, elements having substantially the same functions are designated by the same reference notations. The invention is not limited to the following embodiments.

A drive source mounted to a vehicle may be an engine, a motor, a transmission or the like. The following description is primarily with respect to an engine.

FIG. 1 is a block diagram of an engine control apparatus 10 for a motorcycle according to an embodiment of the invention.

As shown by FIG. 1, the engine control apparatus 10 includes a control CPU (central processing unit) 11 for controlling injection and ignition of the engine and controlling a throttle valve, and an abnormality detecting portion 12 for detecting an abnormality of the engine control apparatus 10.

Control CPU 11 is inputted with sensor signals of a throttle position sensor 21, an accelerator position sensor 22, an engine rotational number sensor 23, a speed sensor 24, and a water temperature sensor 25 and the like. A fuel injection amount, an ignition timing, an opening degree of a throttle valve and the like necessary for controlling the engine are calculated and control signals thereof are output. The control signals are inputted to a drive circuit 16 for controlling a drive motor 31 of a throttle valve (not illustrated), and a drive circuit 17 for driving a fuel injection valve 32, and an ignition plug 33 to execute a predetermined electronic control.

The abnormality detecting portion 12 repeatedly detects an abnormality of the engine control apparatus 10 at a predetermined abnormality detecting period (for example, a period of 1 ms). When an abnormality is detected in engine control apparatus 10, a fail signal is outputted to a primary abnormality processing portion 14, and by receiving the signal, the primary abnormality processing portion 14 cuts the drive of the throttle valve (primary abnormality processing). When an abnormality is not detected in the engine control apparatus 10, an electronic control at normal time of the engine control apparatus 10 is executed.

When an abnormality is detected at a preceding period and the primary abnormality processing is executed, the primary abnormality processing is released when an abnormality is not detected at a succeeding period, and the electronic control at normal time is executed, however, the control is switched by a short period of about 1 ms and therefore, a rider does not feel a change in vehicle behavior.

Although the primary abnormality processing is cutting to drive the throttle valve, other processing such as, for example, a reduction in fuel injection amount, a delay in ignition time or the like may be executed.

When the abnormality detecting signal detected by abnormality detecting portion 12 continues even after elapse of a predetermined abnormality determining time period (for example, 20 ms), it is determined that an abnormality exists in engine control apparatus 10, and the primary abnormality processing which has been executed is shifted to a secondary abnormality processing.

The secondary abnormality processing corresponds to an inherent processing when an abnormality exists and is executed by cutting the drive of the throttle valve. When the throttle valve drive is cut as the primary abnormality processing, successively, the processing is continued.

A determination of whether the abnormality detecting signal continues even after an elapse of the predetermined abnormality determining time period is carried out by a counter 13 counting an abnormality detecting signal from the abnormality detecting portion 12.

An abnormality detection by abnormality detecting portion 12 can include abnormalities of parts other than engine control apparatus 10 such as, for example, drive motor 31 of the throttle valve, fuel injection valve 32, ignition plug 33, sensor signals (including disconnection, shortcircuit and the like of a wiring).

Although an abnormality detecting period for detecting abnormality of engine control apparatus 10 and the abnormality determining time period for determining whether the inherent abnormality exists are not particularly limited, it is preferable that the abnormality detecting period is a short period to a degree by which a change in vehicle behavior is not felt even when there is a switch to primary abnormality processing. Further, the abnormality determining time period is set to a long period to a degree by which a detection by noise or the like is excluded. For example, it is preferable that the abnormality detecting period is equal to or smaller than $1/20$ of the abnormality determining time period.

Further, engine control apparatus 10 is not necessarily limited to a hardware constitution as shown in FIG. 1. For example, although primary abnormality processing portion 14 and secondary abnormality processing portion 15 are constituted separately from control CPU 11, operation thereof may be executed by a predetermined program inside of control CPU 11. Further, although abnormality detecting portion 12 is also shown as independent, abnormality detection control may be carried out inside of control CPU 11.

According to the embodiment explained above, the abnormality of the engine control apparatus is detected by the predetermined abnormality detecting period, when the abnormality is detected, the primary abnormality processing is executed. When the abnormality is not detected, the primary abnormality processing is released, the electronic control at normal time is executed and abnormality detection by noise or the like is thereby excluded. Further, when the abnormality detecting signal continues even after elapse of the predetermined abnormality determining time period, primary abnormality processing is shifted to secondary abnormality processing and control of the engine control apparatus based on the abnormal output is thereby avoided. Thereby, a change in vehicle behavior is restrained and reliability of the engine control apparatus is promoted.

Although the drive force control apparatus and its control method are described by the example of engine control apparatus 10, the effect of the invention is achieved even for drive sources other than the engine (for example, a motor, a transmission or the like).

Figure 2:
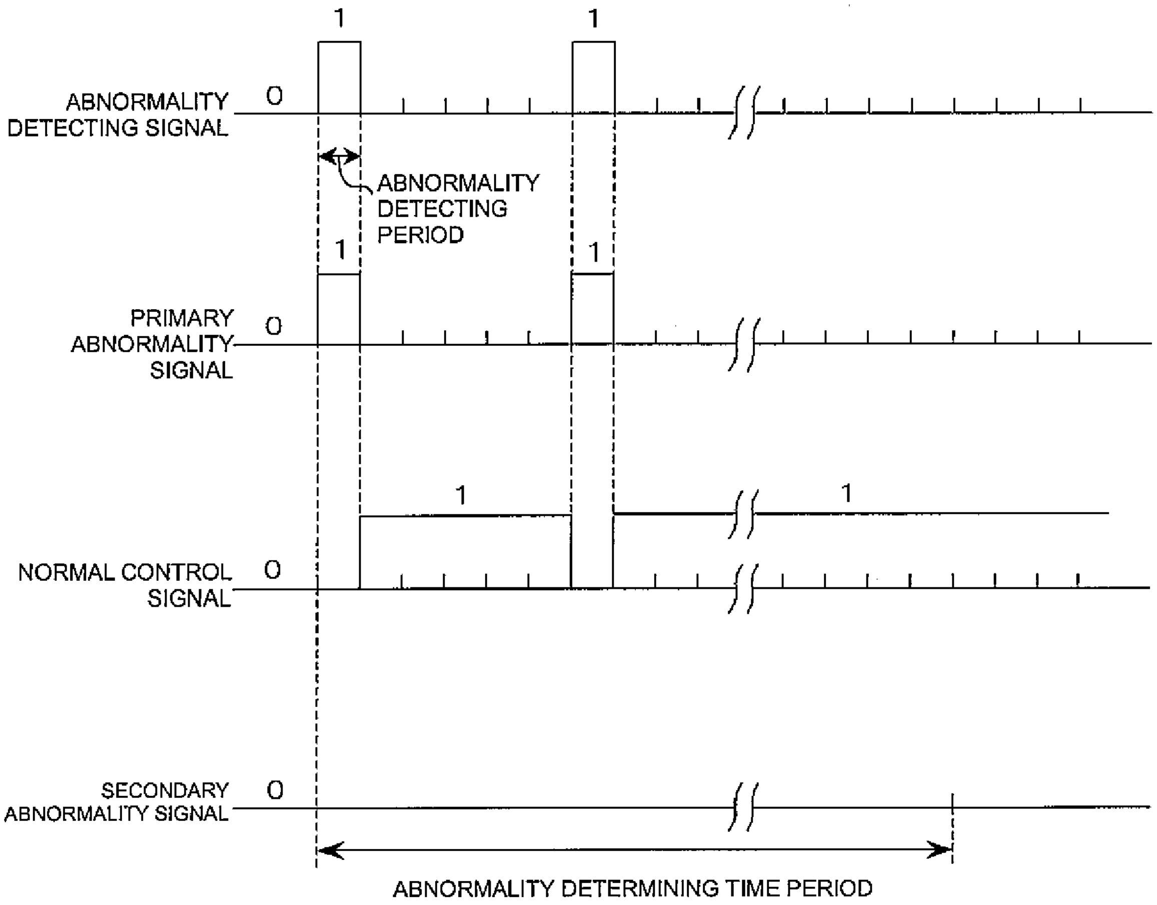
FIG. 2 is a diagram showing an example of an abnormality detecting signal, a primary abnormality signal, a normal control signal, and a secondary abnormality signal according to the invention.
Figure 3:
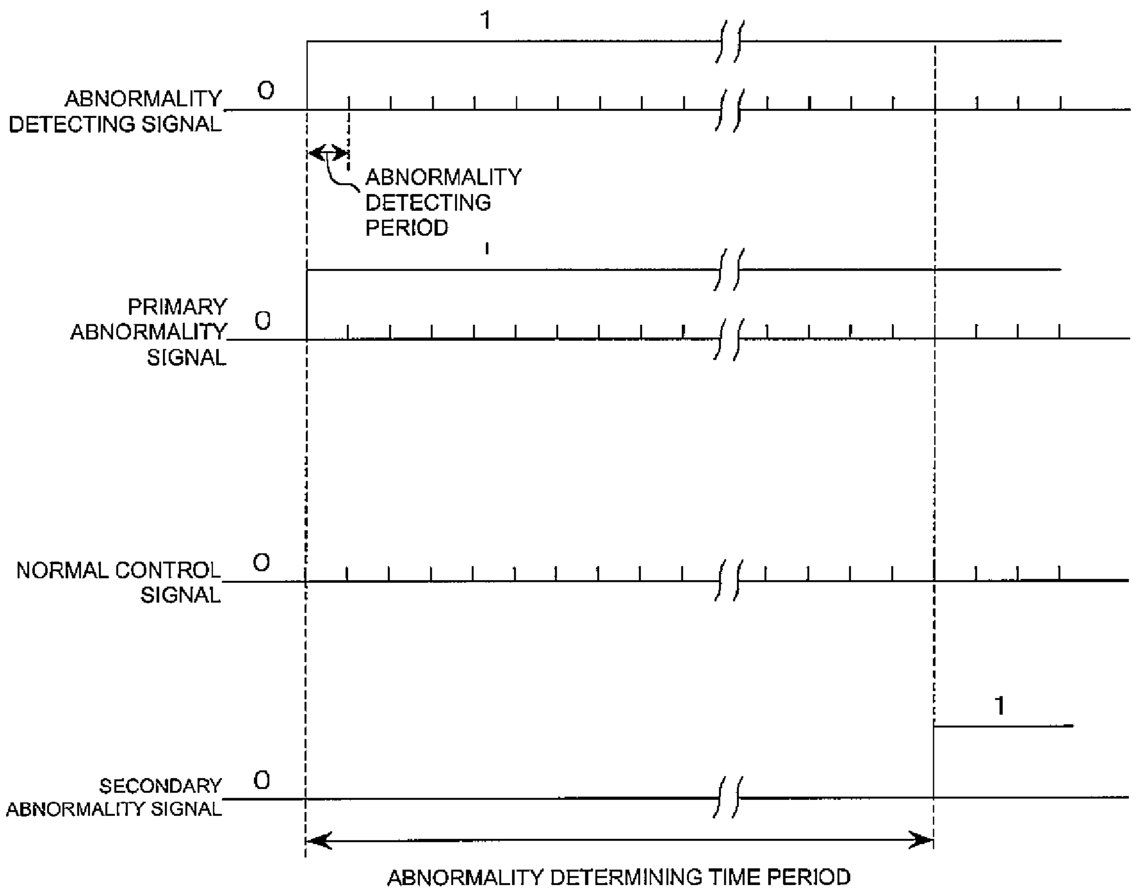
FIG. 3 is a diagram showing an example of the abnormality detecting signal, the primary abnormality signal, the normal control signal, and the secondary abnormality signal according to the invention.

FIGS. 2 and 3 show an example of an abnormality detecting signal, a primary abnormality signal, a normal (at normal time) control signal, and a secondary abnormality signal according to the invention.

An abnormality of engine control apparatus 10 is repeatedly detected by abnormality detecting portion 12 by the predetermined abnormality detecting period (for example, a period of 1 ms). When the abnormality is detected, the primary abnormality determining signal (fail signal) is outputted. By receiving the signal primary abnormality processing portion 14 outputs the primary abnormality signal, and based on the signal, the primary abnormality processing (for example, cutting the throttle valve drive) is executed. When an abnormality of engine control apparatus 10 is not detected, the normal (at normal time) control signal is outputted, and by receiving the signal by control CPU 11, the electronic control at normal time of engine control apparatus 10 is executed. That is, in correspondence with ‘0’ or ‘1’ of the abnormality detecting signal, either of the primary abnormality signal or the normal control signal is outputted, and by the signals, either primary abnormality processing or normal electronic control is executed by engine control apparatus 10.

In FIG. 2, the abnormality detecting signal is not continued even after elapse of the predetermined abnormality determining time period (for example, 20 ms) and therefore, it is determined that an abnormality does not exist in engine control apparatus 10. The secondary abnormality signal is not outputted and secondary abnormality processing is not executed.

In contrast, as shown in FIG. 3, when the abnormality detecting signal continues even after elapse of the predetermined abnormality determining time period, it is determined that an abnormality exists in engine control apparatus 10. After elapse of the abnormality determining time period, the secondary abnormality signal is outputted, as a result, secondary abnormality processing is executed in engine control apparatus 10.

Figure 4:
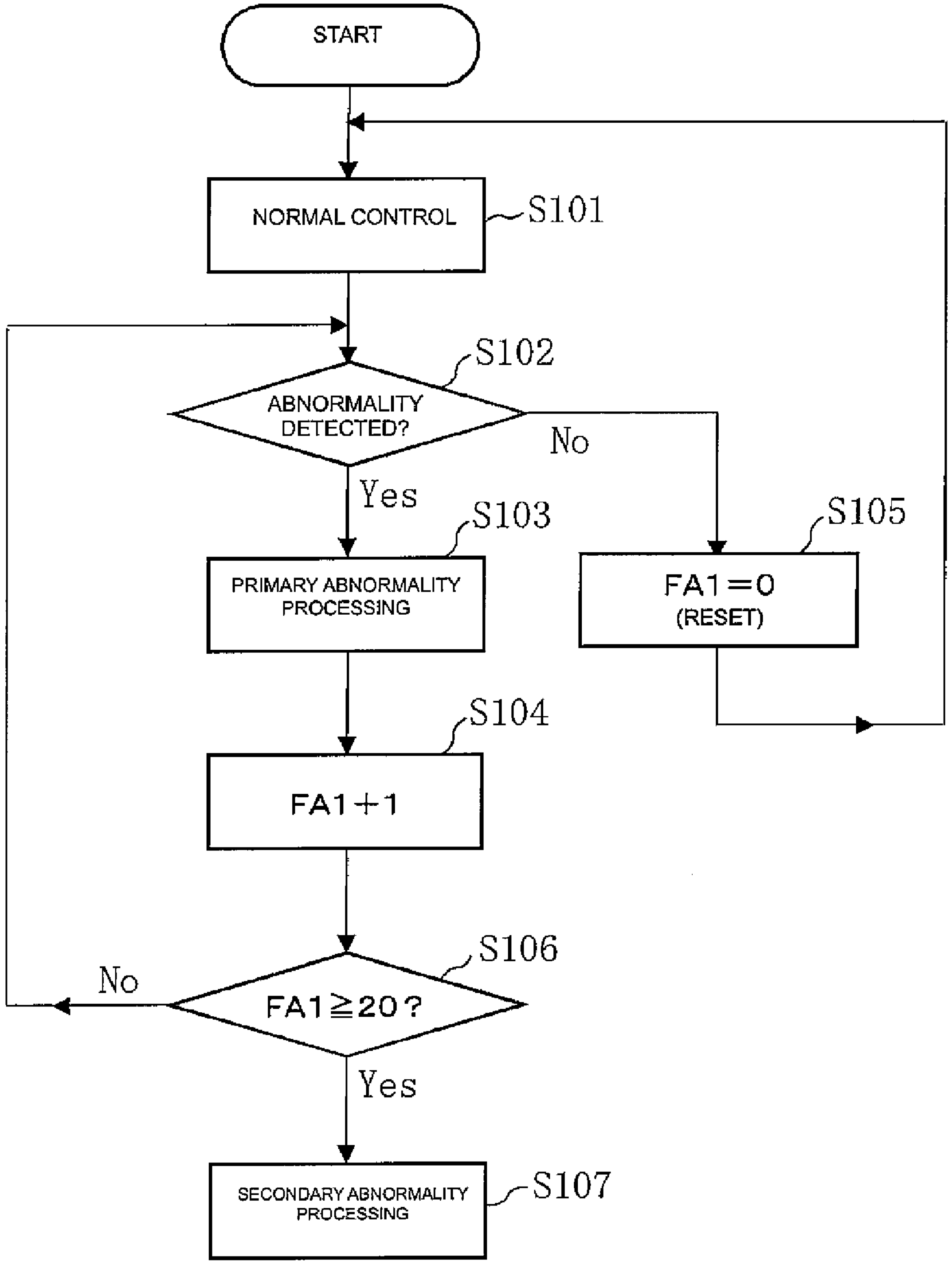
FIG. 4 is a flowchart of the embodiment of the invention.

FIG. 4 is a flowchart of the embodiment. With regard to engine control apparatus 10 executing normal control (step S101), it is determined whether an abnormality is detected in engine control apparatus 10 (step S102). When an abnormality is detected in the engine control apparatus, primary abnormality processing is executed (step S103). At this occasion, the primary abnormality signal (FA1) is set to ‘1’ signifying the abnormality.

On the other hand, when an abnormality is not detected in engine control apparatus 10, the primary abnormality signal (FA1) is set to ‘0’ signifying normality (step S105), and normal control is continued (step S101). When FA1=1 (abnormality detection) is set at a preceding period and primary abnormality processing is executed, a reset signal for releasing primary abnormality processing is also outputted along therewith.

When an abnormality is detected in engine control apparatus 10, at step S104, the abnormality detecting signal (FA1) is counted by counter 13, and it is determined whether a predetermined count number (for example, 20 or more) is reached (step S106). When the predetermined count number is reached, secondary abnormality processing is executed (S107). When the predetermined count number is not reached, the operation returns to S102 to determine the presence or absence of abnormality detection.

The routine of steps S101 through S106 is repeatedly executed by the abnormality detecting period (for example, a period of 1 ms) and therefore, that FA1 counted at step S106 reaches the predetermined count number signifies that the abnormality detecting signal continues even after elapse of the predetermined abnormality determining time period (for example, 20 ms). In this case, it is determined that an abnormality exists in engine control apparatus 10 and secondary abnormality processing is executed in engine control apparatus 10.

By executing the processing by the above-described steps, an abnormality detection by noise or the like is excluded. Further, even when an abnormality is determined finally while avoiding control of the engine control apparatus by abnormal output, a change in vehicle behavior is restrained and reliability of the engine control apparatus is promoted.

Figure 5:
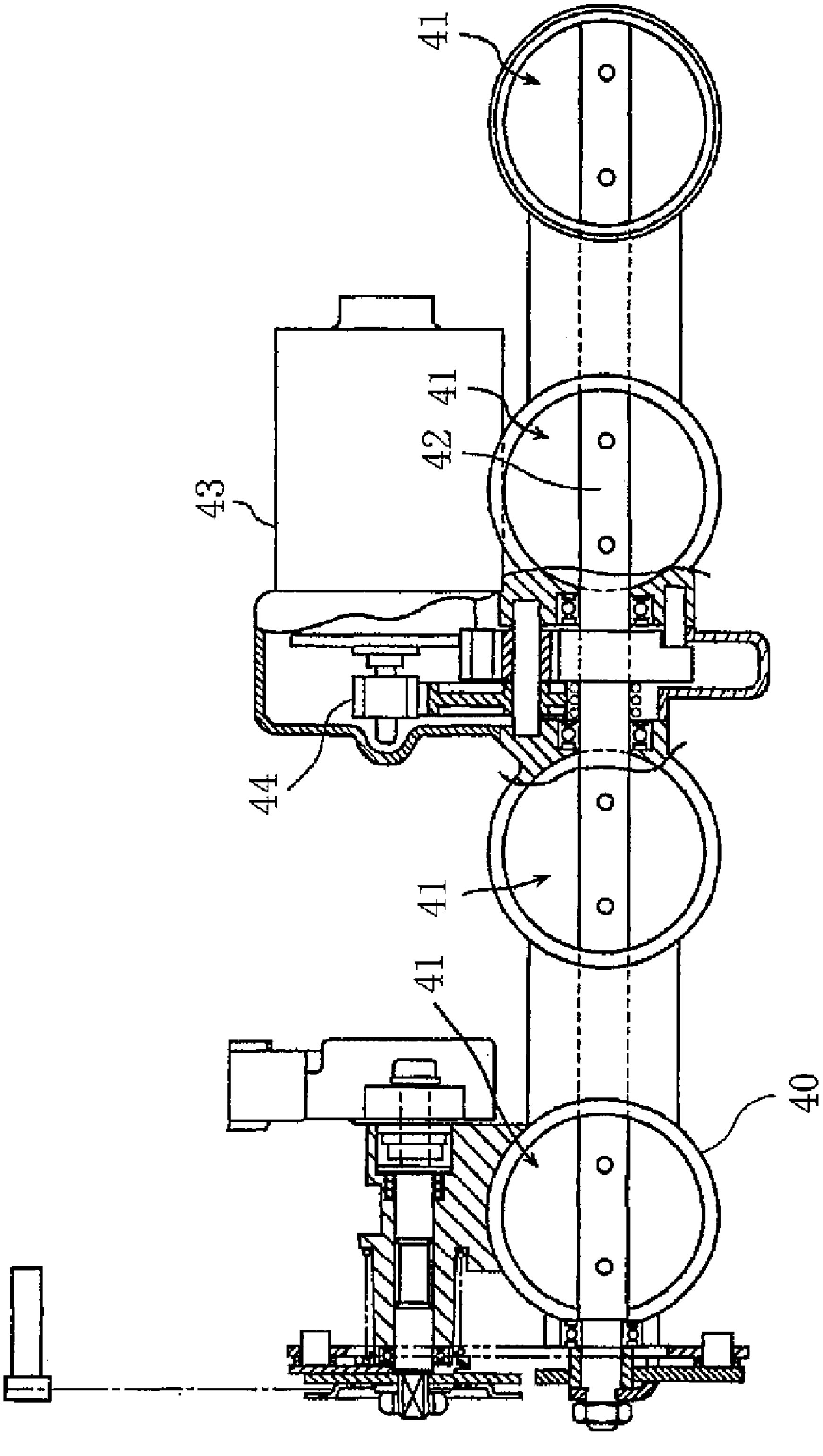
FIG. 5 is a view of an electronic throttle mechanism according to the invention.

FIG. 5 shows an electronic throttle mechanism of the invention mounted to a motorcycle. A throttle body 40 is constituted by a cylindrical shape, a throttle valve 41 is fixed to one piece of common valve shaft 42 arranged to penetrate all of the throttle bodies 40. A drive motor 43 is arranged such that a rotating shaft thereof is in parallel with the valve shaft 42 and the valve shaft 42 is driven to rotate by a plurality of gears 44 in rotating the drive motor 43.

Figure 6:
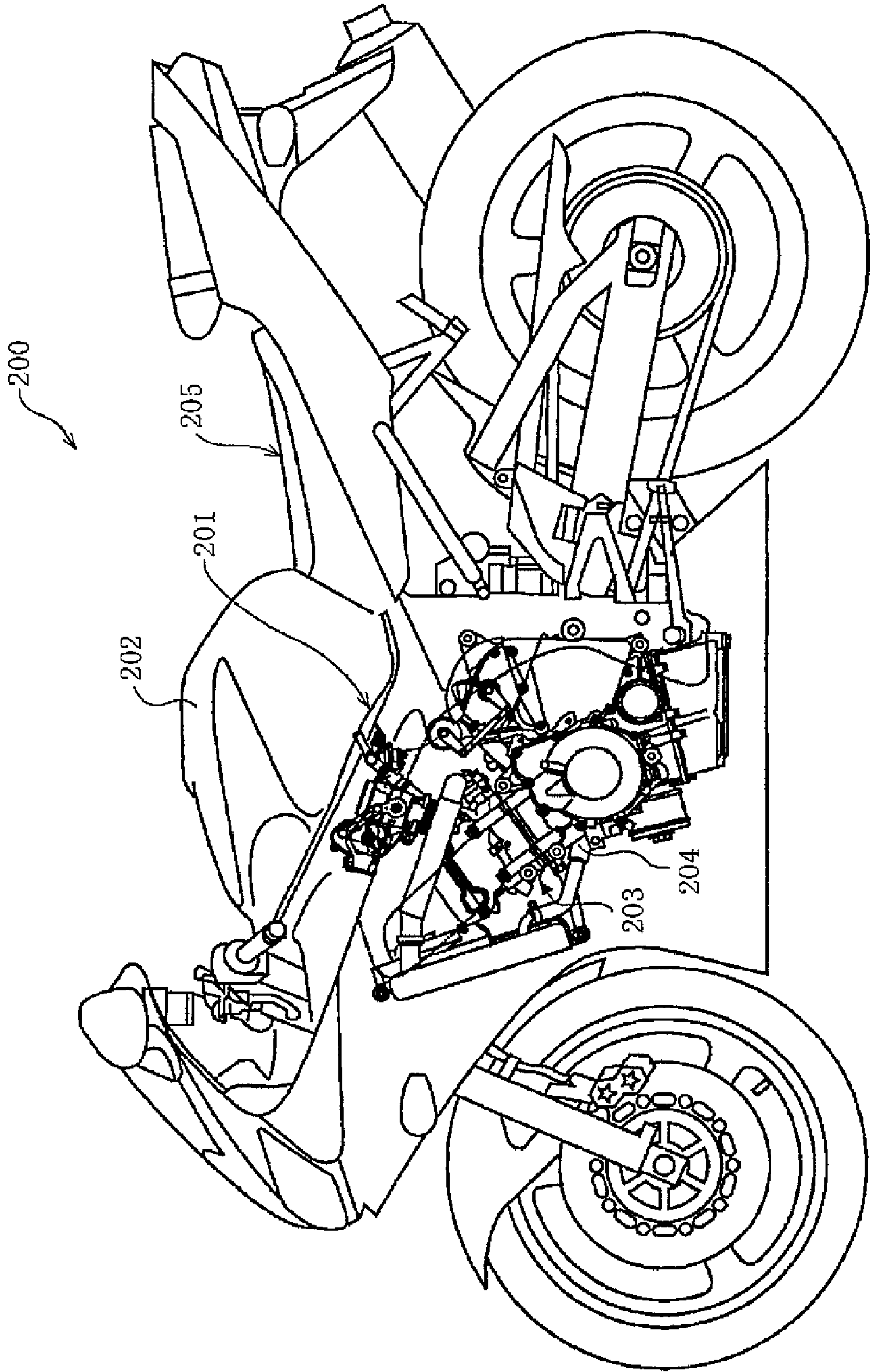
FIG. 6 is a view of a motorcycle mounted with the engine control apparatus of the invention.

FIG. 6 shows a motorcycle 200 mounted with engine control apparatus 10 according to the invention. A fuel tank 202 is provided above a tank rail 201 and an engine unit 203 is arranged therebelow. An engine unit 203 functions as a power source of water cooling type 4 cycle parallel 4 cylinders and the engine control apparatus (not illustrated) is mounted below a seat 205.

The invention is not limited to the described embodiments. The invention may be applied to other types of vehicles such as motorbikes, scooters, three-wheeled vehicles, four-wheeled vehicles all terrain vehicles (ATVs) snow mobiles and so on.

Further, although control of a drive source such as an engine, a motor, a transmission or the like is described, an apparatus in a path for transmitting a drive force such as, for example, a clutch or the like may also be controlled.

According to the invention, there is provided a drive force control apparatus for a riding vehicle (motorcycle) that restrains change in vehicle behavior by noise or the like.

The particular embodiments of the invention described in this document should be considered illustrative, rather than restrictive. Modification to the described embodiments may be made without departing from the spirit of the invention as defined by the following claims.

The invention claimed is:

1. A drive force control apparatus for a riding type vehicle comprising:

a drive source; and an abnormality detecting portion for detecting an abnormality of the drive force control apparatus, wherein the abnormality detecting portion detects the abnormality of the drive force control apparatus by a predetermined abnormality detecting period, wherein when the abnormality of the drive force control apparatus is detected by the abnormality detecting portion, a primary abnormality processing of the drive force control apparatus is executed, and when the abnormality is not detected, the primary abnormality processing is released and an electronic control at normal time of the drive force control apparatus is executed, and when an abnormality detecting signal detected by the abnormality detecting portion continues even after elapse of a predetermined abnormality determining time period, the primary abnormality processing is shifted to a secondary abnormality processing.

2. The drive force control apparatus according to claim 1, wherein the predetermined abnormality detecting period is equal to or smaller than $1/20$ of the predetermined abnormality determining time period.

3. The drive force control apparatus according to claim 1, wherein the drive source is an engine, a motor, or a transmission.

4. The drive force control apparatus according to claim 1, wherein the primary abnormality processing includes a same processing as the secondary abnormality processing.

5. A riding type vehicle mounted with the drive force control apparatus of claim 1.

6. A control method of a drive force control apparatus for a riding type vehicle, for controlling a drive force by a drive source mounted to a vehicle, comprising the steps of:

detecting an abnormality of the drive force control apparatus by a predetermined abnormality detecting period;

executing a primary abnormality processing of the drive force control apparatus when the abnormality of the drive force control apparatus is detected, releasing the primary abnormality processing and executing a control at normal time of the drive force control apparatus when the abnormality is not detected; and shifting the primary abnormality processing to a secondary abnormality processing when a detected abnormality detecting signal continues even after a predetermined abnormality determining time period.

7. The control method of claim 6, wherein the drive source is an engine, a motor, or a transmission.

* * * * *